US009514324B1

(12) United States Patent
Potlapally et al.

(10) Patent No.: US 9,514,324 B1
(45) Date of Patent: Dec. 6, 2016

(54) APPROACHES FOR RESTRICTING ACCESS TO DATA

(71) Applicant: Amazon Technologies, Inc., Reno, NV (US)

(72) Inventors: Nachiketh Rao Potlapally, Arlington, VA (US); Jonathan Matthew Miller, Burke, VA (US); Eric Jason Brandwine, Haymarket, VA (US); Stephen Edward Schmidt, Herndon, VA (US); Donald Lee Bailey, Jr., Penn Laird, VA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/311,027

(22) Filed: Jun. 20, 2014

(51) Int. Cl.
*G06F 21/62* (2013.01)
*H04L 29/06* (2006.01)

(52) U.S. Cl.
CPC .......... *G06F 21/6218* (2013.01); *H04L 63/10* (2013.01)

(58) Field of Classification Search
CPC .................................................. G06F 21/6218
See application file for complete search history.

(56) References Cited

U.S. PATENT DOCUMENTS

| 8,676,593 | B2* | 3/2014 | Nagpal et al. ................. 705/1.1 |
| 2003/0115469 | A1* | 6/2003 | Shippy et al. ................ 713/178 |
| 2013/0110985 | A1* | 5/2013 | Shekher et al. .............. 709/219 |
| 2013/0303085 | A1* | 11/2013 | Boucher et al. ............. 455/41.1 |
| 2014/0013112 | A1* | 1/2014 | Cidon et al. .................. 713/165 |

* cited by examiner

*Primary Examiner* — Morshed Mehedi
*Assistant Examiner* — Vance Little
(74) *Attorney, Agent, or Firm* — Hogan Lovells US LLP

(57) ABSTRACT

A computer-implemented method includes restricting access to customer data to certain geographic regions authorized by the customer. The restriction can be managed by associating policy information with the customer data that identifies the geographic regions authorized by the customer. Resources attempting to access the customer data can evaluate the policy information associated with the customer data with respect to the geographic location in which the resource is located to determine whether the resource is permitted to access the customer data. The restriction can also be managed by encrypting the customer data with a cryptographic key that corresponds to the customer and/or the authorized geographic regions.

20 Claims, 12 Drawing Sheets

APPROACHES FOR RESTRICTING ACCESS TO DATA

BACKGROUND

As an increasing number of applications and services are being made available over networks, such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources.

It might be the case, however, that a customer will have applications that relate to, or utilize, restricted data, such that the customer will want to be able to execute operational actions to the restricted data, or have the resource provider execute operational actions on the customer's behalf, while still abiding by legal or organizational constraints that regulate which entities have the authority to access the restricted data and to execute the operational actions.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to managing aspects of resources in an electronic environment. In particular, various embodiments enable customers to restrict access to their data to be accessible to geographic regions authorized by the customer. For example, a customer can specify that it only wants its data to be stored on resources that are physically located within North America. As used here, resources may refer to physical resources (e.g., servers, host computing devices, storage devices, etc.) or cloud-based resources (e.g., instances) that are hosted by physical resources that are located in geographic regions that have been authorized by the customer.

Conventional approaches for restricting access to data are generally limited. For example, access to data may be restricted using file-based access permissions. Approaches in accordance with various embodiments allow customers to control which resources are able to process or store the customers' data based at least in part on the geographic region (e.g., city, state, country, continent, jurisdiction, or a custom defined region, e.g., "west coast") in which the resources are physically located. For example, if a customer indicates that its data should not be stored on resources geographically located anywhere outside of North America, then the customer's data can be tagged or associated with policy information indicating that the data is restricted to resources that are physically located within North America. These "geo tags" can be evaluated each time the resources are attempting to access the data. Upon evaluation, a resource that is geographically located within North America will be able to access the data whereas a resource that is not geographically located within North America will not be permitted to access the data.

Various other applications, processes and uses are presented below with respect to the various embodiments.

Figure 1:
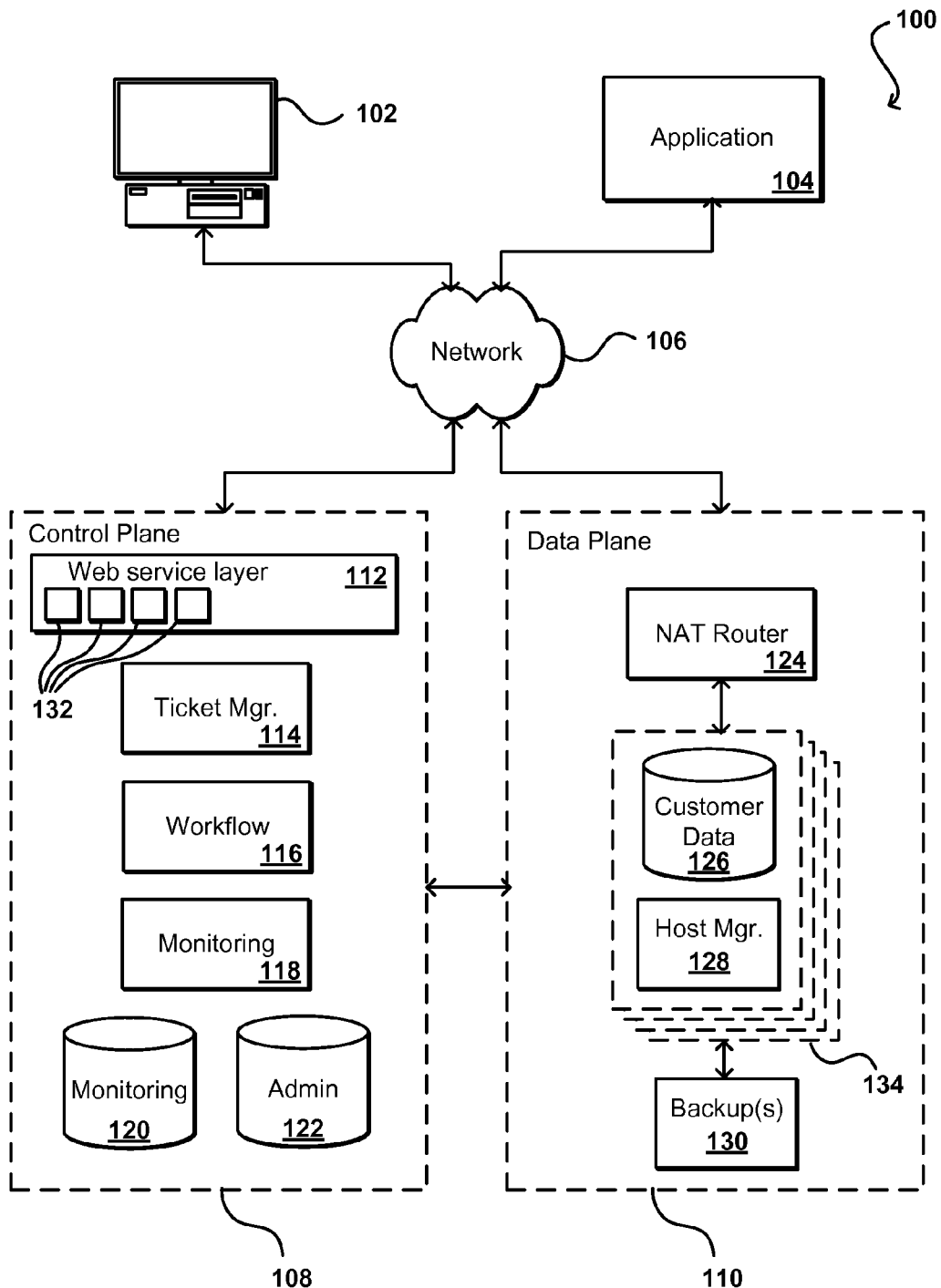
FIG. 1 illustrates an environment in which various embodiments can be implemented.

FIG. 1 illustrates an example resource provider environment 100 that can be utilized in accordance with various embodiments. The resource provider environment 100 can include various resources, systems, and components to provide a resource management service that enables developers, customers, and/or other authorized users to easily and cost-effectively obtain, configure, and manage various resources, such as servers, relational databases, storage devices, and the like. While this example is discussed with respect to the Internet, Web services, and Internet-based technology, it should be understood that aspects of the various embodiments can be used with any appropriate services available or offered over a network in an electronic environment. A management service can enable the utilization of resources without customers having to worry about the administrative complexities of tasks such as deployment, upgrades, patch management, backups, replication, failover, capacity management, scaling, and other such aspects of resource management.

The example resource provider environment 100 illustrated utilizes a separate "control plane" that includes components (e.g., hardware and software) useful for managing aspects of the various resources. In one embodiment, a set of data management application programming interfaces (APIs) or other such interfaces are provided that allow a user or customer to make calls into the provider environment to perform certain tasks relating to the resources. The user still can use the direct interfaces or APIs to communicate with the resources, however, and can use specific APIs of the control plane only when necessary to manage the resources or perform a similar task.

In the example of FIG. 1, a computing device 102 for an authorized user is shown to be able to make calls through a network 106 into a control plane 108 to perform a task, e.g., to update software on a server of the data plane 110. Approaches in accordance with various embodiments described utilize a physical segmentation of resources in the data plane 110 based on geographic locations in which those resources are physically located. For example, resources can be physically segmented into resource centers (e.g., data centers, server farms, etc.) that include physical resources (e.g., a NAT router 124, servers, storage devices, etc.). Each resource can be associated with one or more particular geographic regions (e.g., city, state, country, continent, jurisdiction, a custom defined region, e.g., "west coast") in which the physical resource is located. These physical resources can be used to host instances 134, as described herein. Naturally, the geographic locations associated with the instances 134 will correspond to the respective geographic locations of the physical resources that are hosting the instances 134.

The user or an application 104 can access the resource for certain non-management tasks directly through an interface of a data plane 110. While an end user computing device and application are used for purposes of explanation, it should be understood that any appropriate user, application, service, device, component, or resource can access the interface(s) of the control plane and/or data plane as appropriate in the various embodiments.

The control plane 108 in this example is essentially a virtual layer of hardware and software components that handles control and management actions, e.g., provisioning, scaling, replication, etc. The control plane in this embodiment includes a Web services layer 112, or tier, which can include at least one Web server, for example, along with computer-executable software, application servers, or other such components. The Web services layer also can include a set of APIs 132 (or other such interfaces) for receiving Web service calls or requests through the network 106. Each API can be provided to receive requests for at least one specific action to be performed with respect to the data environment, e.g., to provision, scale, clone, or hibernate an instance of a resource, for example, a relational database. Upon receiving a request to one of the APIs, the Web services layer can parse or otherwise analyze the request to determine the steps or actions that are needed to act on or process the call. For example, a Web service call might be received that includes a request to create a data repository. In this example, the Web services layer can parse the request to determine the type of data repository to be created, the storage volume requested, the type of hardware requested (if any), or other such aspects. Information for the request can be written to an administration ("Admin") data store 122, or other appropriate storage location or job queue, for subsequent processing.

A Web service layer in one embodiment includes a scalable set of customer-facing servers that can provide the various control plane APIs and return the appropriate responses based on the API specifications. The Web service layer also can include at least one API service layer that in one embodiment consists of stateless, replicated servers which process the externally-facing customer APIs. The Web service layer can be responsible for Web service front end features, e.g., authenticating customers based on credentials, authorizing the customer, throttling customer requests to the API servers, e.g., endpoints, validating user input, and marshalling or unmarshalling requests and responses. For example, an endpoint can be a Uniform Resource Locator (URL) that is an entry point for accessing a web service. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

The control plane in this embodiment includes what is referred to herein as a "ticket manager" component 114. A ticket manager component can be any appropriate component operable to determine any tasks to be executed in response to an outstanding request. In this example, the Web services layer might place instructions or information for a request in a job queue, and the ticket manager can identify the outstanding request and determine any tasks corresponding to the request. Various other approaches can be used as would be apparent to one of ordinary skill in the art, such as the Web services layer sending a notification to a ticket manager that a job exists. The ticket manager component can identify the request, and using information for the request can send a request, call, or other such command to a workflow component 116 operable to instantiate at least one workflow for the request. The workflow in one embodiment is generated and maintained using a workflow service as is discussed elsewhere herein. A workflow in general is a sequence of tasks that should be executed to perform a specific job. The workflow is not the actual work, but an abstraction of the work that controls the flow of information and execution of the work. A workflow also can be thought of as a state machine, which can manage and return the state of a process at any time during execution. A workflow component (or system of components) in one embodiment is operable to manage and/or perform the hosting and executing of workflows for tasks, including, for example: repository creation, modification, and deletion; recovery and backup; security group creation, deletion, and modification; user credentials management; and key rotation and credential management. Such workflows can be implemented on top of a workflow service, as discussed elsewhere herein.

An example workflow for a customer might include tasks, e.g., provisioning a data store instance, allocating a volume of off-instance persistent storage, attaching the persistent storage volume to the data store instance, then allocating and attaching a Domain Name Service (DNS) address or other address, port, interface, or identifier which the customer can use to access or otherwise connect to the data instance. In this example, a user is provided with the DNS address and a port address to be used to access the instance. The workflow also can include tasks to download and install any binaries or other information used for the specific data storage technology (e.g., MySQL). The workflow component can manage the execution of these and any related tasks, or any other appropriate combination of such tasks, and can generate a response to the request indicating the creation of a "database" in response to the "create database" request, which actually corresponds to a data store instance in the data plane 110, and provide the DNS address to be used to access the instance. A user then can access the data store instance directly using the DNS address and port, without having to access or go through the control plane 108. Various other workflow templates can be used to perform similar jobs, e.g., deleting, creating, or modifying one of more data store instances, such as to increase storage. In some embodiments, the workflow information is written to storage, and at least one separate execution component pulls, or otherwise accesses or receives, tasks to be executed based upon the workflow information. For example, there might be a dedicated provisioning component that executes provisioning tasks, and this component might not be called by the workflow component, but can monitor a task queue or can receive information for a provisioning task in any of a number of related ways as should be apparent.

As mentioned, various embodiments can take advantage of a workflow service that can receive requests or calls for a current state of a process or task, such as the provisioning of a repository, and can return the current state of the process. The workflow component and/or workflow service do not make the actual calls or requests to perform each task, but instead manage the state and configuration information for the workflow that enables the components of the control plane to determine the next task to be performed, and any information needed for that task, then generate the appropriate call(s) into the data plane including that state information, whereby a component of the data plane can make the call to perform the task. Workflows and tasks can be scheduled in parallel in order to increase throughput and maximize processing resources. As discussed, the actual performing of the tasks will occur in the data plane, but the tasks will originate from the control plane. For example, the workflow component can communicate with a host manager, which can make calls into the data store. Thus, for a given task, a call could be made to the workflow service passing certain parameters, whereby the workflow service generates the sequence of tasks for the workflow and provides the current state, such that a task for the present state can be performed. After the task is performed (or otherwise resolved or concluded), a component such as the host manager can reply to the service. The reply can provide information about the next state in the workflow, such that the next task can be performed. Each time one of the tasks for the workflow is performed, the service can provide a new task to be performed until the workflow is completed. Further, multiple threads can be running in parallel for different workflows to accelerate the processing of the workflow.

The control plane 108 in this embodiment also includes at least one monitoring component 118. When a data instance is created in the data plane, information for the instance can be written to a data store in the control plane, e.g., a monitoring data store 120. It should be understood that the monitoring data store can be a separate data store, or can be a portion of another data store such as a distinct set of tables in an Admin data store 122, or other appropriate repository. A monitoring component can access the information in the monitoring data store to determine active instances 134 in the data plane 110. A monitoring component also can perform other tasks, e.g., collecting log and/or event information from multiple components of the control plane and/or data plane, e.g., the Web service layer, workflow component, ticket manager component, and various host managers. Using such event information, the monitoring component can expose customer-visible events, for various purposes, including, for example, implementing customer-facing APIs. A monitoring component can constantly monitor the health of all the running repositories and/or instances for the control plane, detect the failure of any of these instances, and initiate the appropriate recovery process(es).

Each instance 134 in the data plane can include at least one data store 126 and a host manager component 128 for the machine providing access to the data store. The host manager in one embodiment is an application or software agent executing on an instance and/or application server, e.g., a Tomcat or Java application server, programmed to manage tasks, e.g., software deployment and data store operations, as well as monitoring a state of the data store and/or the respective instance. The host manager in one embodiment listens on a port that can only be reached from the internal system components, and is not available to customers or other outside entities. In some embodiments, the host manager cannot initiate any calls into the control plane layer. The host manager can be responsible for managing and/or performing tasks such as setting up the instances for a new repository, including setting up logical volumes and file systems, installing database binaries and seeds, and starting or stopping the repository. The host manager can monitor the health of the data store, as well as monitoring the data store for error conditions such as I/O errors or data storage errors, and can restart the data store if necessary. The host manager can also perform and/or manage the installation of software patches and upgrades for the data store and/or operating system. The host manger also can collect relevant metrics, such as may relate to CPU, memory, and I/O usage.

The monitoring component can communicate periodically with each host manager 128 for monitored instances 134, e.g., by sending a specific request or by monitoring heartbeats from the host managers, to determine a status of each host. In one embodiment, the monitoring component includes a set of event processors (or monitoring servers) configured to issue commands to each host manager, e.g., to get the status of a particular host and/or instance. If a response is not received after a specified number of retries, then the monitoring component can determine that there is a problem and can store information in the Admin data store 122 or another such job queue to perform an action for the instance, e.g., to verify the problem and re-provision the instance, if necessary. The ticket manager can access this information and kick off a recovery workflow for the instance to attempt to automatically recover from the failure. The host manager 128 can act as a proxy for the monitoring and other components of the control plane, performing tasks for the instances on behalf of the control plane components. Occasionally, a problem will occur with one of the instances, e.g., the corresponding host, instance, or volume crashing, rebooting, restarting, etc., which cannot be solved automatically. In one embodiment, a logging component can log these and other customer visibility events. The logging component can include an API or other such interface such that if an instance is unavailable for a period of time, a customer can call an appropriate "events" or similar API to get the information regarding the event. In some cases, a request may be left pending when an instance fails. Since the control plane in this embodiment is separate from the data plane, the control plane never receives the data request and thus cannot queue the request for subsequent submission (although, in some embodiments, this information could be forwarded to the control plane). Thus, the control plane in this embodiment provides information to the user regarding the failure so the user can handle the request as necessary.

As discussed, once an instance is provisioned and a user is provided with a DNS address or other address or location, the user can send requests "directly" to the data plane 110 to directly interact with that instance 134. In one embodiment, the data plane takes the form of (or at least includes or is part of) a cloud computing environment, or a set of Web services and resources that provides data storage and access across a "cloud" or dynamic network of hardware and/or software components. A DNS address is beneficial in such a dynamic cloud environment, as instance or availability failures, for example, can be masked by programmatically remapping a DNS address to any appropriate replacement instance for a use. A request received from a user 102 or application 104, for example, can be directed to a network address translation (NAT) router 124, or other appropriate component, which can direct the request to the actual instance 134 or host corresponding to the DNS of the request. As discussed, such an approach allows for instances to be dynamically moved, updated, replicated, etc., without requiring the user or application to change the DNS or other address used to access the instance. As discussed, each instance 134 can include a host manager 128 and a data store 126, and can have at least one backup instance or copy in persistent storage 130. Using such an approach, once the instance has been configured through the control plane, a user, application, service, or component can interact with the instance directly through requests to the data plane, without having to access the control plane 132. For example, the user can directly issue structured query language (SQL) or other such commands relating to the data in the instance through the DNS address. The user would only have to access the control plane if the user wants to perform a task such as expanding the storage capacity of an instance. In at least one embodiment, the functionality of the control plane 108 can be offered as at least one service by a provider that may or may not be related to a provider of the data plane 110, but may simply be a third-party service that can be used to provision and manage data instances in the data plane, and can also monitor and ensure availability of those instances in a separate data plane 110.

As discussed, however, it is possible that a customer will want to utilize a set of resources or services provided through the resource provider environment while still having the ability to control or restrict access to the data, for example, for purposes of being be stored, processed, or both. Thus, approaches in accordance with various embodiments, allow a customer to control which resources are authorized to access the customer's data based at least in part on the geographic region in the resources are located or being hosted.

For example, an organization may not want its data to be stored anywhere outside of North America. Similarly, another organization may want its data to be stored and any computations performed using that data to occur anywhere except a particular country. In another example, organizations may simply want to ensure that their use of resources, for example, computing, storage, or otherwise, satisfies particular legal compliance requirements, in addition to any preferences or policies of the customer. For example, a legal compliance requirement may require the customer to store and process its data within specific geographic regions.

Figure 2A:
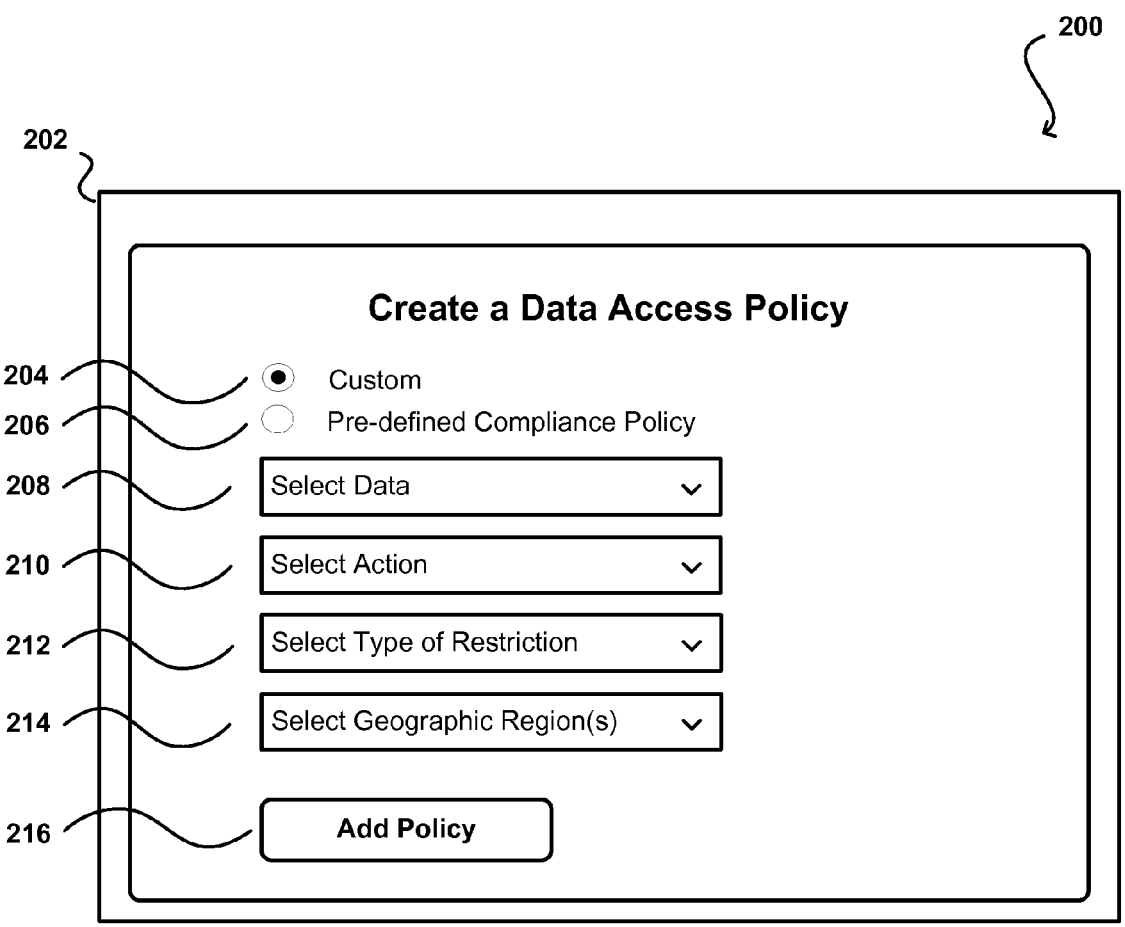
FIGS. 2(a)-(c) illustrate an example approach for restricting access to data in accordance with various embodiments.

Thus, approaches in accordance with various embodiments allow customers to control access to their data, for example, by interacting with a graphical user interface (GUI) 202, as illustrated in the example of FIG. 2(a). Customers can also control access to data by making calls through one or more APIs or by interacting with a console interface. The interface 202 can be accessed, for example, through the control plane 108, as described in reference to FIG. 1.

A customer can interact with the interface 202 to define custom data access policies that restrict resources from accessing the customer's data, for example, based on the geographic location in which those resources are located. For example, the customer can define a custom policy 204 by identifying or selecting the data 208 whose access is to be controlled, selecting the action(s) that will apply to this policy 210, specify the type of restriction 212, and identify the geographic region(s) to which this policy applies.

Customers have the option to define policies at varying levels of granularity. For example, when identifying the data 208 to be restricted, the customer can choose to geographically restrict access to all, or a portion, of the customer's data. That is, a customer can opt to restrict all of the data, for example, all of the data stored in a data store 126. A customer can also geographically restrict access to a portion of the data, for example, stored in one or more virtual "buckets." In some instances, the customer's data may be organized in data stores using buckets in which "objects," e.g., files or data snapshots, are stored. Customers can use these buckets to group related objects similar to how files are grouped in directories in a file system. Customers can also restrict access to individual objects or files stored in buckets or data stores.

When defining the policy, the customer can also indicate the type of action 210 that is being restricted. For example, the customer can indicate whether storage of the customer's data is restricted to resources located in a particular geographic location(s), whether processing of the customer's data, e.g., data mining, is restricted to resources located in particular geographic location(s), or both.

The customer can also specify the type of restriction 212 being applied to the data. For example, the customer can specify a "containment" restriction which is configured to restrict access to the customer's data to particular geographic regions selected by the customer. Thus, the data will be contained within these geographic regions and will generally not be permitted to be accessed by, or stored on, resources that are located in an unauthorized geographic region. For example, the customer can specify that the customer's data is to be contained in the United States. As a result, only resources that are physically located within the United States will be permitted to store and access the customer's data. These same restrictions will apply to instances that are running on resources. Another type of restriction is an "exclusionary" restriction that the customer can select to prevent resources that are located in certain geographic regions from accessing its data. For example, the customer can specify that resources that are physically located in the state of New York are excluded from storing and/or accessing the customer's data.

The customer can specify which geographic region or regions 214 are affected by the policy being created. The customer can select the option 216 to generate the data access policy based on the specified parameters.

In some embodiments, the customer can simply indicate that the customer's data must comply with one or more pre-defined compliance policies 206. Such compliance policies may be based on, for example, legal requirements that restrict access or storage of certain types of data to certain geographic regions. In response, to ensure compliance with such policies, the resource provider can generate policies to appropriately restrict access to the customer's data to resources in particular geographic regions or to exclude resources in certain geographic regions.

Other approaches to interacting with the GUI 202 are possible. For example, the interface 202 may show a visual listing of the customer's data or data stores. The customer can then associate items in the list with particular geographic regions within which the data should be confined or excluded. For example, geographic regions can be visually depicted using a geographic map or buckets having an icon, e.g., an image of flag, that visually describes the corresponding geographic region. The customer can drag-and-drop a data item into regions in the geographic map or into buckets to associate items in the list with particular geographic regions within which the data should be confined or excluded.

Once the policy has been created, the data 208 identified by the customer will be associated, i.e., "tagged," with information describing the policy.

As mentioned, customers can perform operations through API calls made to various endpoints. In some embodiments, such geography-based access restrictions for data are extended to hosts from which API calls are received. For example, a host that is attempting to make API calls to access particular data may be physically located in a geographic region that is blacklisted (for example, as determined by geolocating the host's source Internet Protocol address) by the policy information associated with the particular data. In such instances, the endpoint receiving the calls is configured to prevent the host from making API calls to access the particular data.

Figure 2B:
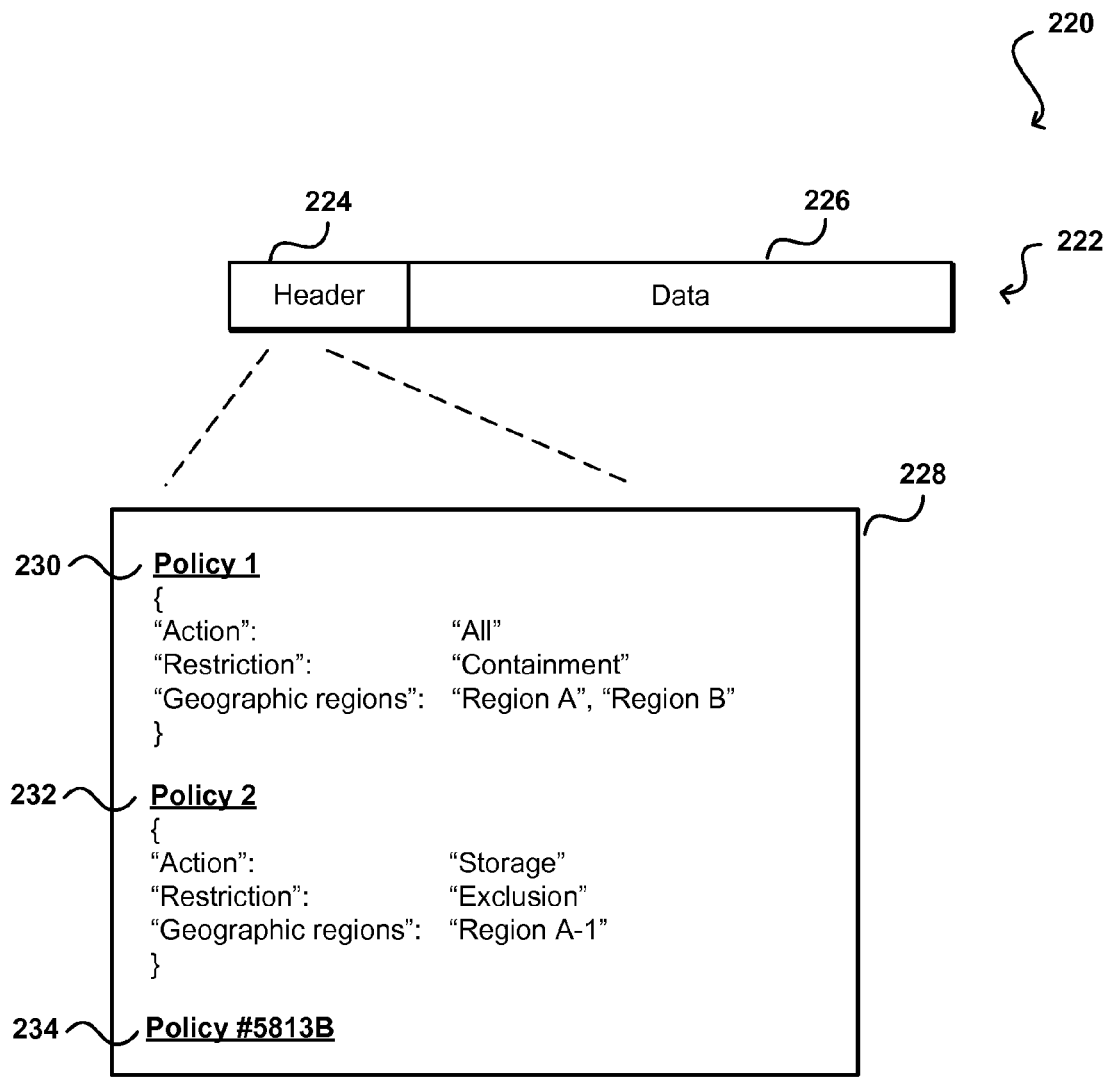
Figure 2C:
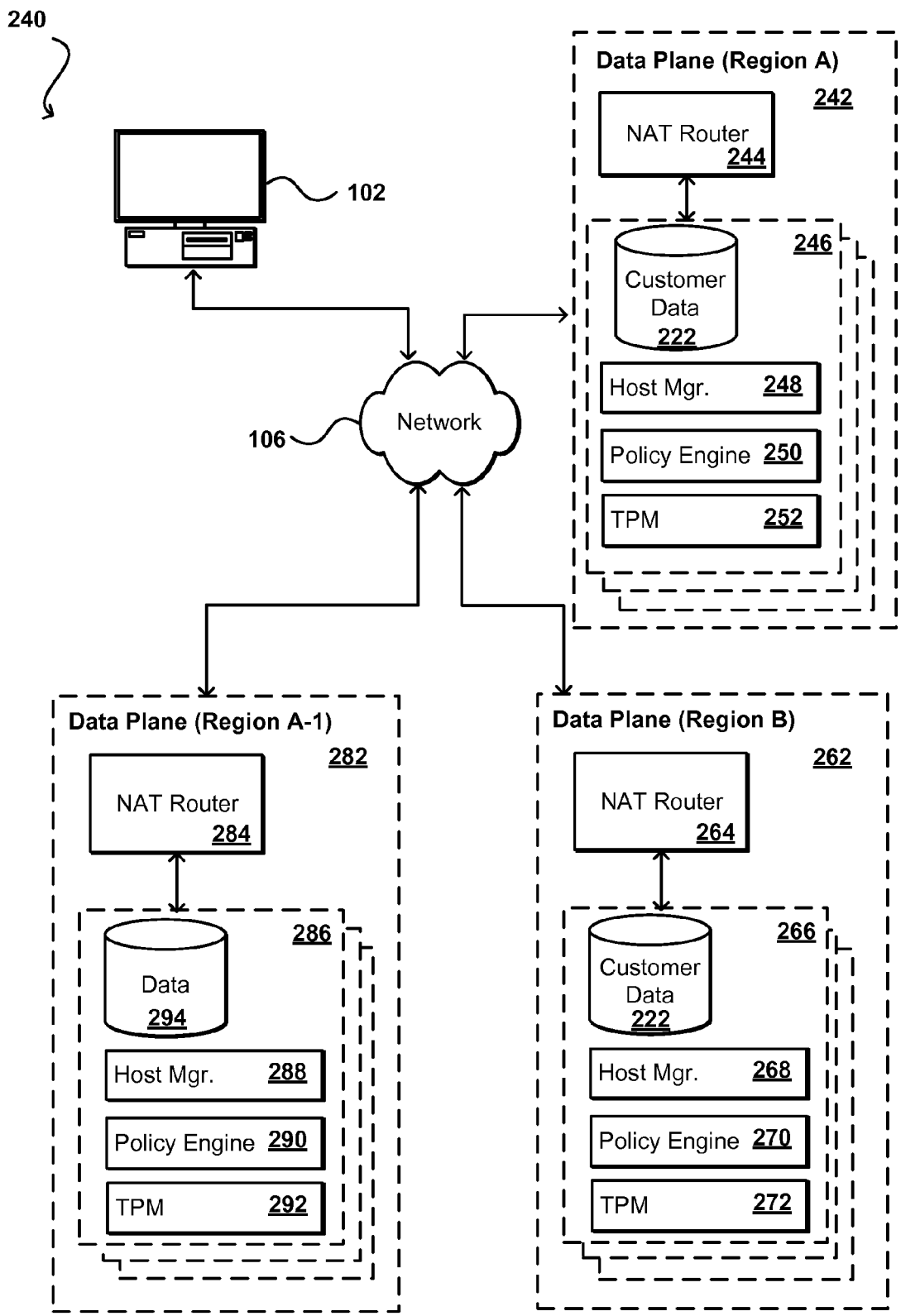

FIG. 2(*b*) illustrates example data object 222 that has been tagged with policy information 228. The object 222 includes a header portion 224 and a data portion 226. The header 224 typically describes information, e.g., metadata, about the object 222. For example, the header 224 can describe information such as the date the object 222 was created, the date the object 222 was last updated, and the size of the data 226. In some embodiments, the policy information 228 for the object 222 is embedded in the header 224, for example, using JavaScript Object Notation (JSON). Before a resource accesses the object 222, for example, for purposes of performing computations using the object 222 or for storing the object 222 in a data store, the resource will evaluate the policy information 228 associated with the object 222 to determine whether the resource is authorized to access the object 222 based at least in part on a physical geographic location associated with the resource.

In some instances, access to the object 222 may be controlled using multiple policies that further restrict access to the object 222. For example, in FIG. 2(*b*), the object 222 has been tagged with policy information 228 that describes access policies 230 and 232. The policy 230 specifies that access to the object 222 (i.e., processing, storage, or otherwise) is restricted to resources that are physically located in the geographic regions "Region A" and "Region B."

The policy 232 further restricts access to the object 222 by preventing resources that are physically located in "Region A-1" from storing the object 222, for example, in a bucket, data store, or otherwise. In this example, the "Region A-1" is geographically located within the geographic region "Region A." This feature allows customers to further refine which geographic regions will have access to their data. For example, "Region A" may refer to a continent and the customer may want to generally allow access to their data to resources located in the continent "Region A" except for a particular country "Region A-1" within the continent "Region A."

The policy information 228 described in referenced to FIG. 2(*b*) is provided as one example approach for controlling access to customer data. Indeed, other approaches for authorizing resources or not authorizing resources are possible. For example, the header 224 can simply include information describing geographic regions, for example, in the form of codes or identifiers, that are authorized to access the data. Similarly, the header 224 can include information that includes information describing geographic regions that are not authorized to access the data. In some embodiments, the policy information 228 can identify policies by simply including corresponding references that identify the policies. For example the policy identifier 234 in the policy information 228 references a policy "5813B." This policy identifier 234 can be used to obtain information describing the policy 5813B from the resource provider.

As illustrated in FIG. 2(*c*), approaches in accordance with various embodiments utilize a physical segmentation of resources (e.g., a NAT router 244, servers, server instances 246, endpoints, each associated with a host manager and potentially data storage) based on geographic locations in which those resources are physically located. For example, in FIG. 2(*c*), the data plane has been segmented into geographic regions "Region A" 242, "Region B" 262, and "Region A-1" 282. Each of the regions 242, 262, and 282 may have respective data centers that are physically located within the regions and house resources (e.g., a NAT router 244, servers, server instances 246, networking hardware, endpoints, etc.) that instances can utilize.

In some embodiments, prior to taking action (e.g., performing computations using the data, storing the data, etc.) on data, each resource in the segmented data plane is configured to evaluate policy information associated with the data to confirm that the actions being performed by the resource are authorized, for example, based at least in part on the geographic restrictions specified in the policy information.

Resources, or instances, can include policy engines that are configured to evaluate policy information associated with data and determine whether the resource or instance is or is not authorized to access the data. For example, the instance 246 in "Region A" includes a policy engine 250. When the instance 246 is attempting to access the object 222, for example, for purposes of performing computations using the object or for storing the object, the policy engine 250 will evaluate the policy information 228 associated with the object 222 to determine whether the resource is authorized to access the object 222. In this example, the policy information 228 indicates that access to the object 222 is to be confined to "Region A" and "Region B." The policy information 228 also indicates that "Region A-1" is not authorized to store a copy of the object 222. Thus, the policy engine 250 evaluate the policy information 228 based at least in part on the geographic location(s) associated with the instance 246 to determine that the instance 246 is authorized to access the object 222. The policy engine can be configured to evaluate the policy information 228 each time the object 222 is accessed (e.g., used for processing, storage, being copied or transmitted to another resource).

Thus, in FIG. 2(*c*), resources, e.g., instance 246, that are physically located in the geographic region "Region A" and resources, e.g., instance 266, that are physically located in the geographic region "Region B" are able to access the object 222. In contrast, resources, e.g., instance 286, that are physically located in the geographic region "Region A-1" are not authorized to store the object 222.

In some embodiments, the resources, e.g., instance 246, also include a Trusted Platform Module (TPM) 252, or other secure store, that is provisioned to store one or more credentials, such as cryptographic keys, digital certificates, tokens, or other security information. The TPM can be used to verify that the customer's data is being processed in accordance with access policies defined by the customer. One example approach for verifying that the customer's data is being processed as directed by the customer involves assigning resources asymmetric key pairs based on the respective geographic locations in which the resources are located. Thus, in the example of FIG. 2(*c*), instances, e.g., instance 246, in the region "Region A" will have a particular set of asymmetric keys, while instances, e.g., the instance 266, in the region "Region B" will have a different set of asymmetric keys. Instances in the region "Region A-1," e.g., the instance 286, which is located within the region "Region A" can be assigned a different set of asymmetric keys than the region "Region A." The public key for each geographic region can be made available to customers, for example through a web site. The authenticity of these public keys may be validated by a trusted third-party to further ensure the accuracy of the verification process.

To verify that customer data is being accessed as directed, each resource is configured to generate information describing the types of operations that were performed on the customer's data. This information can be stored, for example, in a log that is signed by the resource using the private key stored in the resource's TPM. As mentioned, asymmetric keys are assigned to resources based on the geographic region in which those resources are located. The resources can use their respective private keys stored in the TPM to encrypt (or digitally sign) the log. Since each private key corresponds to a particular geographic region, encrypting or digitally signing the log using the private key confirms that the encryption or signature was performed by a resource that is physically located in the particular geographic region.

Customers can request such encrypted logs, for example, through the control plane 108, a website, the GUI 202, a console interface, or API calls. To verify that only authorized resources were used to access the customer's data, the customer can also obtain the corresponding public keys for the geographic regions that the customer has authorized to access the customer's data. The customer can then attempt to use these public keys to decrypt the encrypted logs. The customer can confirm that resources in an authorized geographic region were used if the logs are able to be decrypted using a public key corresponding to an authorized geographic region. Once decrypted, the customer can parse the information in the logs to further confirm which resources were used to access the customer's data.

Figure 3A:
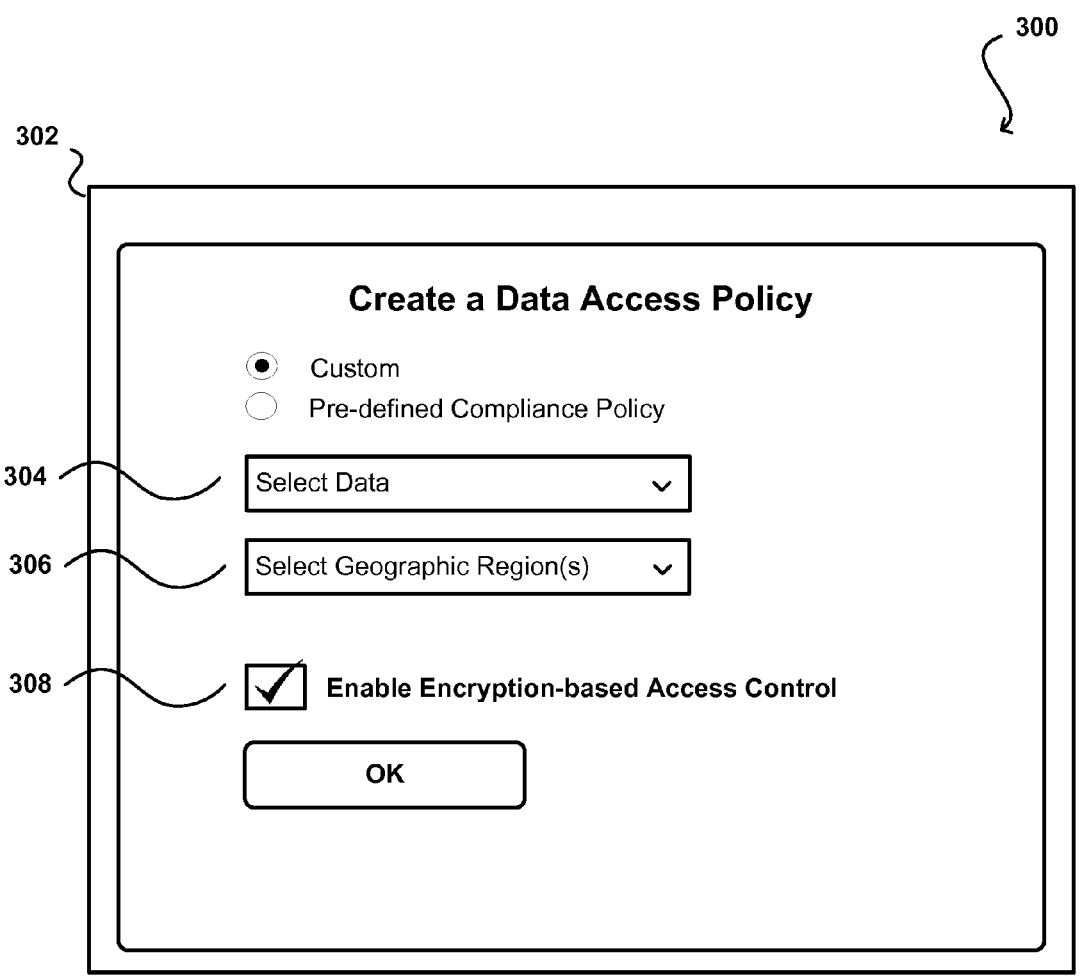
FIGS. 3(a)-(c) illustrate another example approach for restricting access to data in accordance with various embodiments.

In some embodiments, access to customer data can also be controlled through an encryption-based approach. For example, as illustrated in FIG. 3(a), a customer can interact with the interface 302 to identify or select data, e.g., objects, 304 to which access is to be controlled. The customer can also identify geographic regions 306 that are authorized to access the customer's data. Next, the customer can select the option 308 to indicate that encryption-based techniques are to be utilized.

Figure 3B:
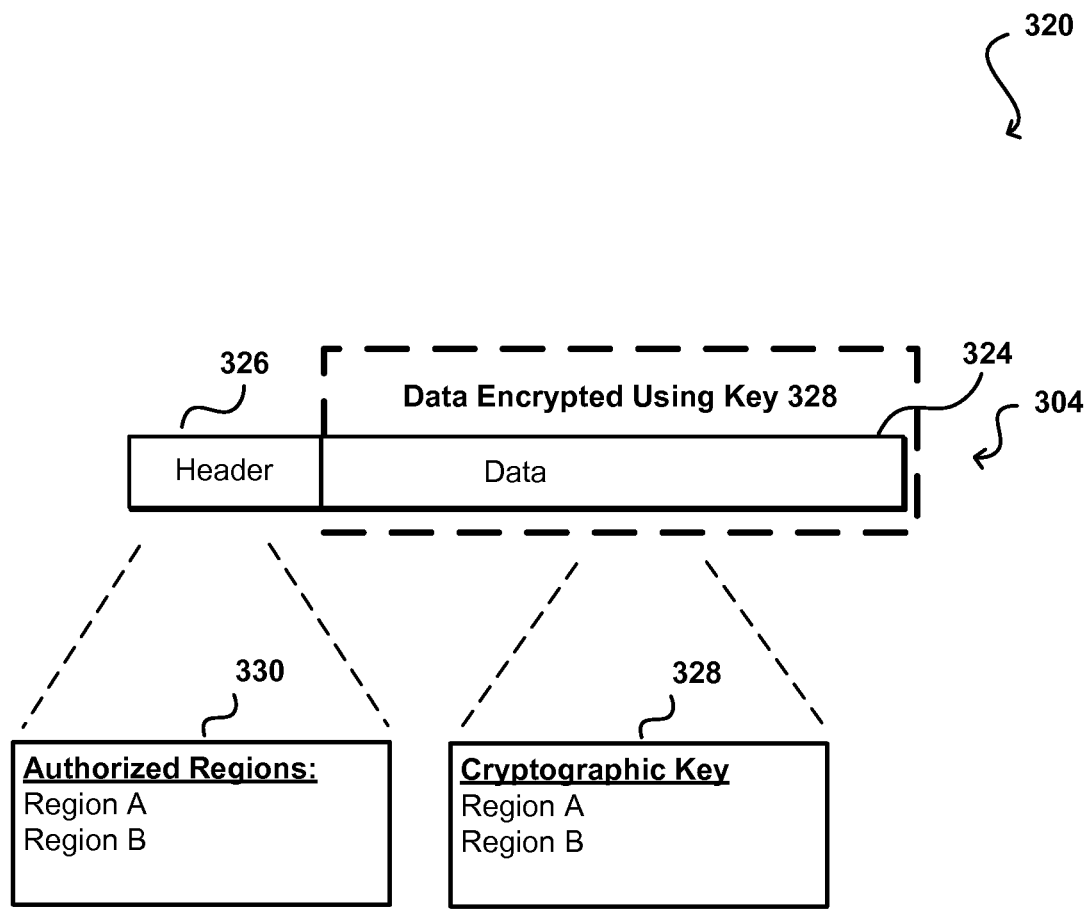

To implement encryption-based access control, a cryptographic key 328 can be generated and used to encrypt the object 304 selected by the customer, as illustrated in the example of FIG. 3(b). The generated key 328 can also be sent to resources that are located in the geographic regions 306 authorized by the customer. In the example of FIG. 3(b), the customer has authorized resources located in the geographic regions "Region A" and "Region B" to access the object 304. In some embodiments, information identifying the authorized geographic regions 330 can be inserted in the header 326 of the object 304. The header 326 can be left unencrypted to allow resources in different geographic regions to easily determine whether they are authorized to decrypt the object 304 using a key that corresponds to the geographic region in which the resources are located. Thus, the data portion 324 of the object 304 can be encrypted using the key 328 while the header 326 is left unencrypted. The generated key 328 can be assigned to resources that are located within the authorized regions 306 "Region A" and "Region B." The generated key 328 can be specifically generated for the customer and the geographic regions 306 authorized by the customer. The key 328 can be generated using generally known techniques. The key 328 need not be limited to symmetric keys and, in various embodiments, asymmetric keys utilized to achieve the approach described above. In some embodiments, rather than inserting information identifying the authorized geographic regions 330 in the header 326 of the object 304, the key 328 with which the object 304 is encrypted is tagged with information identifying the geographic regions that are authorized to access the key 328. In such embodiments, accessibility of the key 328 is restricted to the authorized geographic regions identified in the information associated with the key 328.

Depending on the implementation, the key 328 can be generated by the resource provider and distributed to resources that are in the authorized regions 330 or the key 328 can be generated by one or more resources in the authorized regions 330 and distributed to other resources in the authorized regions 330. As mentioned, the object 304 may be accessible by all resources of the resource provider and each resource can then determine whether or not it has access to the object 304 using the techniques described in this specification. In some embodiments, however, access to the object 304 is regulated using a centralized resource that is configured to distribute the object 304 only to resources that are in the authorized regions 330. In some embodiments, the key 328 can be a cryptography key that is propagated to resources in the authorized regions 330. Resources in each authorized region can then further wrap, e.g., encapsulate or encrypt, the cryptography key with using a region-specific key that corresponds to the respective geographic regions in which the resources are located.

Figure 3C:
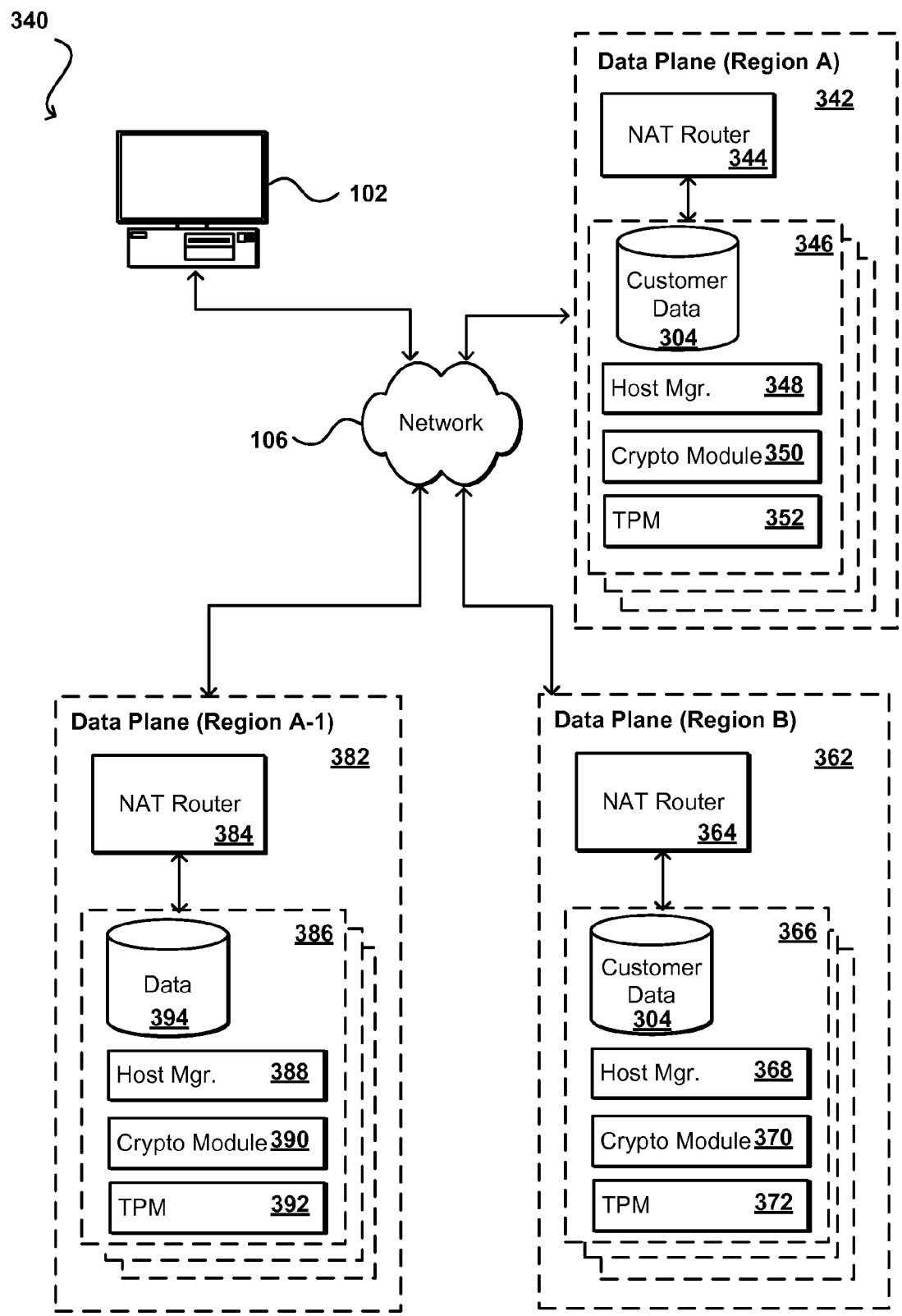

As illustrated in the example of FIG. 3(c), approaches in accordance with various embodiments utilize a physical segmentation of resources based on geographic locations in which those resources are physically located. For example, in FIG. 3(c), the data plane has been segmented into geographic regions "Region A" 342, "Region B" 362, and "Region A-1" 382. Each of the regions 342, 362, and 382 may have respective data centers that are physically located within the regions and house resources that instances can utilize.

Resources, e.g., instances, can include cryptography modules, e.g., the cryptography module 350, that are configured to store keys and perform encryption and decryption of data. For example, the instance 346 in "Region A" includes a cryptography module 350. When the instance 346 is attempting to access the object 304, the cryptography module 350 will attempt to decrypt the encrypted object 304 using a corresponding key stored in the cryptography module 350. In some embodiments, to more easily identify which key corresponds to which data, data can be associated, e.g., tagged, with respective identifiers that reference a corresponding key that is able to decrypt the data.

For example, a resource 346 can decrypt the object 304, perform various operations using the decrypted object 304, and, when the data 304 is ready to be stored, the resource can again encrypt the object 304 using the generated cryptographic key. Thus, if the encrypted object 304 is ever sent, accidentally or otherwise, to a resource in an unauthorized geographic region, the resource in the unauthorized geographic region will not be able to decrypt the object 304 since it does not have access to the corresponding cryptographic key.

In some embodiments, the key 304 is stored in a customer operated key management system. In such embodiments, resources must request keys needed to encrypt or decrypt data directly from the customer operated key management system. Such keys can also be associated with policy-based restrictions, as described in this specification, that regulate which resources are able to access the keys. For example, the key 304 can be associated with policy information indicating that the key should not be sent to resources that are located outside of a particular country.

Depending on the embodiment, encryption-based access control can be implemented separately or in combination with the policy-based access control described in reference to FIG. 2(a). That is, data can be modified to include access control policies specified by customers, as described in reference to FIG. 2(b), and access to the data can also be ensured through encryption-based approaches described herein.

In some instances, the customer may decide to change which geographic regions have access to the customer's data. In such instances, the customer can interact with an interface, e.g., the interface 202 or 302, to modify which geographic regions are authorized to access the customer's data. Depending on the customer's selections, the number of authorized geographic regions may expand or be reduced. In the case of expansion, the approaches described above can be used to control access to the customer's data in the newly specified geographic regions. In the latter case, one or more geographic regions that were previously authorized by the customer are being de-authorized. It may be the case, however, that resources that are located in the de-authorized geographic regions still have access to the customer's data. For example, the customer's data may still be stored in resources located in the de-authorized geographic regions. In such instances, a clean-up operation can be performed to make the customer's data unavailable from all resources that are located in the geographic regions being de-authorized by the customer. For example, the data can be made unavailable by performing a delete operation to remove the customer's data from resources that are storing that data in de-authorized geographic regions or the data can be made unavailable by encrypting the data with keys that make it unusable from within the unauthorized region. In some embodiments, a clean-up operation is performed periodically (e.g., hourly, daily, weekly, monthly) to identify customer data that is accessible to resources in unauthorized geographic regions, and to remove access from such resources to the identified customer data, for example, by deleting the identified customer data from the unauthorized resources.

The resources also include respective TPMs 352, 372, and 392, that are configured to verify that the customer's data is being processed in accordance with access policies defined by the customer, as described above.

Figure 4:
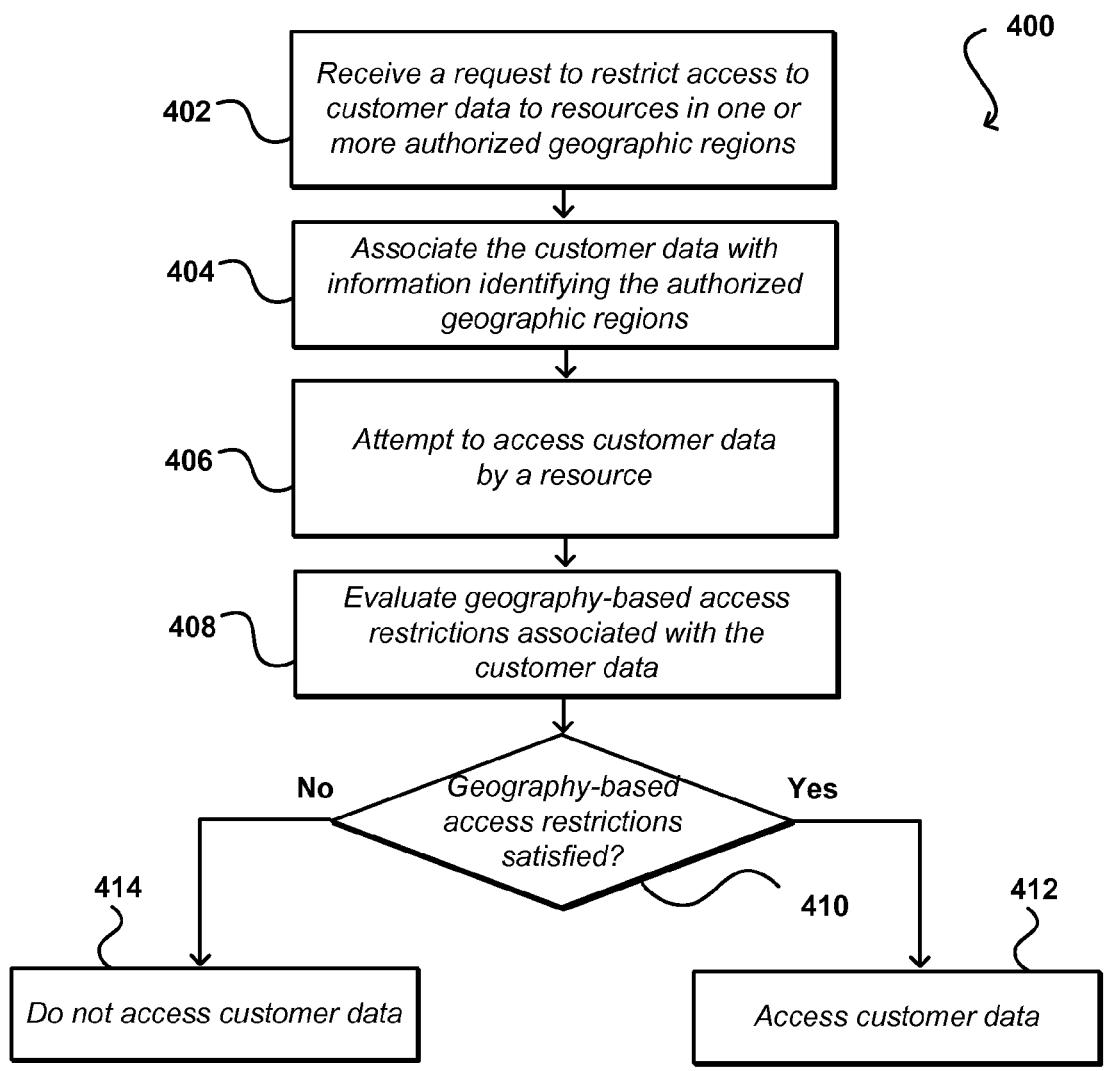
FIG. 4 illustrates an example process for restricting access to data that can be used in accordance with various embodiments.

FIG. 4 illustrates another example process 400 for restricting access to data that can be utilized in accordance with various embodiments. It should be understood that, for any process discussed herein, there can be additional, fewer, or alternative steps performed in similar or alternative orders, or in parallel, within the scope of the various embodiments unless otherwise stated.

In this example, a customer request is received to restrict access to data to resources of a resource provider that are located in a geographic region that has been authorized by the customer 402. This request may explicitly identify geographic regions in which the customer wants to restrict the data. In some instances, the customer may simply select an option to ensure that its data complies with various data compliance policies and geographic regions that comply with the policy can automatically be determined and associated with the customer data.

In response to the request, the customer data is associated with information that identifies the authorized geographic region 404. As discussed, this information can be in the form of policy information or tags. In some embodiments, this information can be inserted into a file header corresponding to the customer data. The customer data, along with the information associated with the data, can be stored by the resource provider, for example, in resources that are located in the authorized geographic region. In some embodiments, a clean-up operation can be performed across resources of the resource provider to ensure that that customer data is unavailable to unauthorized resources. Making the data unavailable can involve sending instructions to each resource of the resource provider to determine whether the customer data is stored or accessible to the resource, and to remove access or delete the customer data from the resource. In some embodiments, the data can be made unavailable by encrypting the data with keys that make it unusable from within the unauthorized region.

A request to access the customer data for which access has been restricted, for example, using policy information or tags, to certain authorized geographic regions can be made 406. Before accessing the customer data, a determination is made whether the source, e.g., a resource of the resource provider or a computing device that is making the request through an API, of the request is permitted by evaluating the access information, e.g., policy information or tags, associated with the customer data to identify geographic regions that have been authorized to access the customer data 408.

A determination is made whether the geographic location of the source of the request matches the authorized geographic regions that are referenced in the access information that is associated with the customer data 410. If the geographic location of the source matches one of the authorized geographic regions referenced in the access information, then the request is permitted and the source is able to access the customer data 412. However, if the geographic location of the source does not match one of the authorized geographic regions referenced in the access information, then the request is denied and the source is not able to access the customer data 414.

Figure 5:
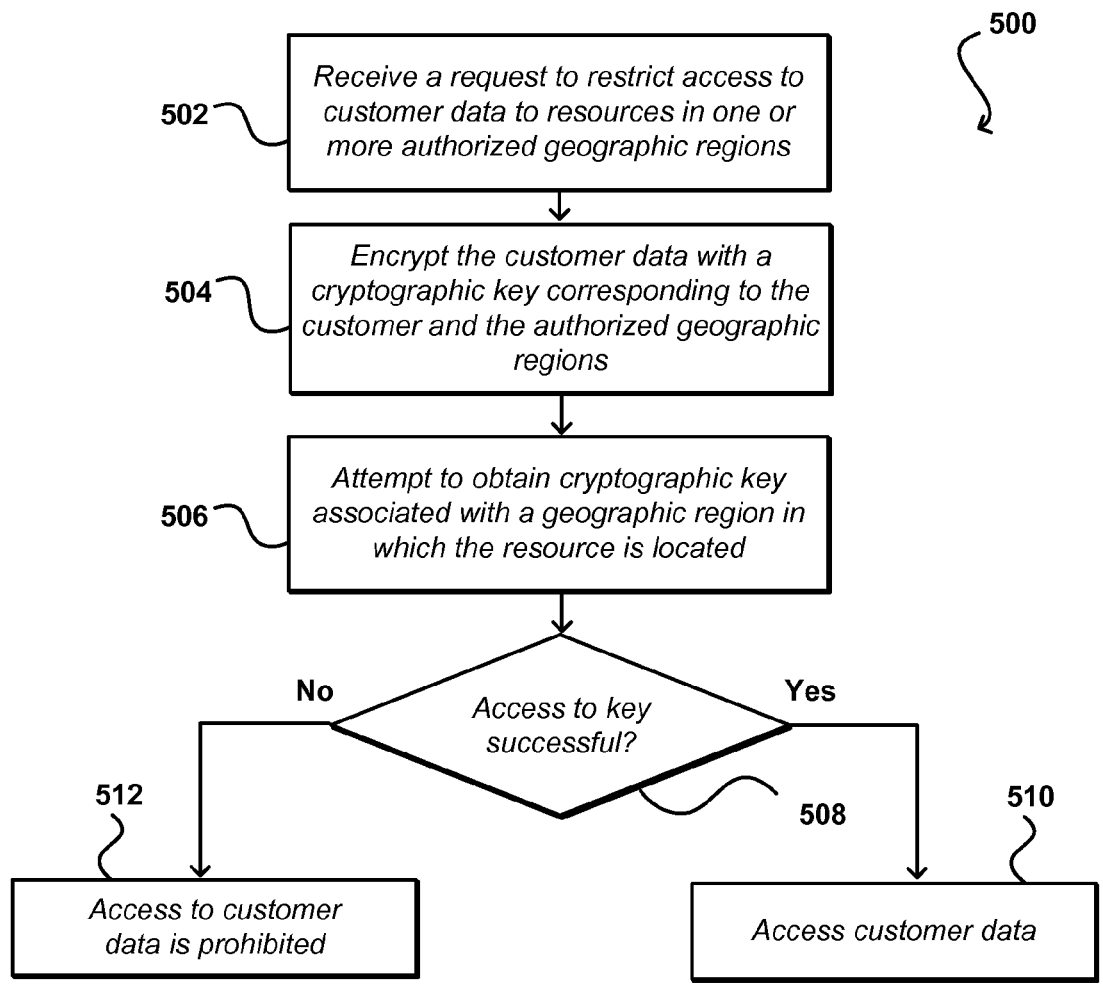
FIG. 5 illustrates another example process for restricting access to data that can be used in accordance with various embodiments.

FIG. 5 illustrates another example process 500 for restricting access to data that can be utilized in accordance with various embodiments. It should be understood that, for any process discussed herein, there can be additional, fewer, or alternative steps performed in similar or alternative orders, or in parallel, within the scope of the various embodiments unless otherwise stated.

In this example, a customer request is received to restrict access to data to resources of a resource provider that are located in a geographic region that has been authorized by the customer 502. This request may explicitly identify geographic regions in which the customer wants to restrict the data. In some instances, the customer may simply select an option to ensure that its data complies with various data compliance policies and geographic regions that comply with the policy can automatically be determined and associated with the customer data. In some embodiments, no customer request is needed to restrict access to the data. Rather, access to customer data is restricted automatically to geographic regions in which the customer is utilizing resources of the resource provider or to geographic regions that were previously specified by the customer. For example, when the customer creates an account, a geographic region may be specified by the customer or automatically selected. Resources created and data stored by the customer will then be automatically created in the initially selected region, unless the customer specifies a different region for the data or resources.

In response to the request, the customer data is encrypted using at least one cryptographic key that corresponds to the authorized geographic region 504. This key can be a global key that is assigned to the authorized geographic region or a key that specifically corresponds to the customer and the authorized geographic region. Depending on the implementation, access to this key can be restricted to resources of the resource provider that are located in the authorized geographic region and attempts by resources that are not located in the authorized geographic region can be denied. In some embodiments, the customer can manage access to the key, for example, through a key management system operated by the customer. In such embodiments, resources attempting to access the customer data will need to obtain access to the key directly from the customer.

In other embodiments, the key can be managed by the resource provider. For example, the resource provider may operate key a key management system that stores keys for one or more geographic regions or regional key management systems, each in a separate geographic region. In either embodiment, when a customer indicates that encryption is to be used to secure data, the service that has the data (e.g., a storage service, a database service, etc.) can send a request to the key management system to encrypt the data along with an indication that that the customer has restricted access to the data. The key management system can verify that the customer requested restricted access and use a key to encrypt the data. The key management system can store or have access to policy that indicates the data restrictions.

The encrypted customer data can be stored by the resource provider, for example, in resources that are located in the authorized geographic region. In some embodiments, a clean-up operation can be performed across resources of the resource provider to make the data unavailable to unauthorized resources. This can involve sending instructions to each resource of the resource provider to determine whether the customer data is stored or accessible to the resource, and to remove access or delete the customer data from the resource. In some embodiments, the data can be made unavailable by encrypting the data with keys that make it unusable from within the unauthorized region.

An attempt to access the customer data for which access has been restricted, for example, using encryption, to certain authorized geographic regions can be made by attempting to obtain access to the cryptographic key used to encrypt the customer data 506. Depending on the implementation, each customer or key management systems of the resource provider can have one or more cryptographic keys that correspond to different geographic regions. That is, a cryptographic key that corresponds to a particular geographic region will only be distributed to resources that are located in that particular geographic region. Resources that are not located in the particular geographic region are not permitted to access or use the cryptographic key for the particular region. Thus, resources are limited to obtaining or using a cryptographic key that corresponds to the geographic region in which those resources are located. As a result, geography-based access restrictions are able to be implemented since only resources that are authorized to access data, as determined based on their respective geographic regions, will be able to obtain or use the key needed to decrypt that data.

In this example, a geographic location of the resource that is attempting to obtain access to or use of the key is evaluated with respect to the geographic regions that are authorized to access the key 508. If the geographic location of the resource matches one of the geographic regions that are authorized to access the key, then the key can be used to decrypt the data. For example, the resource could be granted access to the key or a key management system can decrypt the data using the key and send the decrypted data to the resource. However, if the geographic location of the resource does not match one of the geographic regions that are authorized to access the key, then the resource is denied access to the key or the key management system denies the resource's request to decrypt the data and, as a result, the resource is unable to access the data 512. For example, a request from the resource to access the key or the key management system may fail, which may involve, for example, denying the request and sending data describing a denial back to the requestor or just silently denying the request and not responding.

Figure 6:
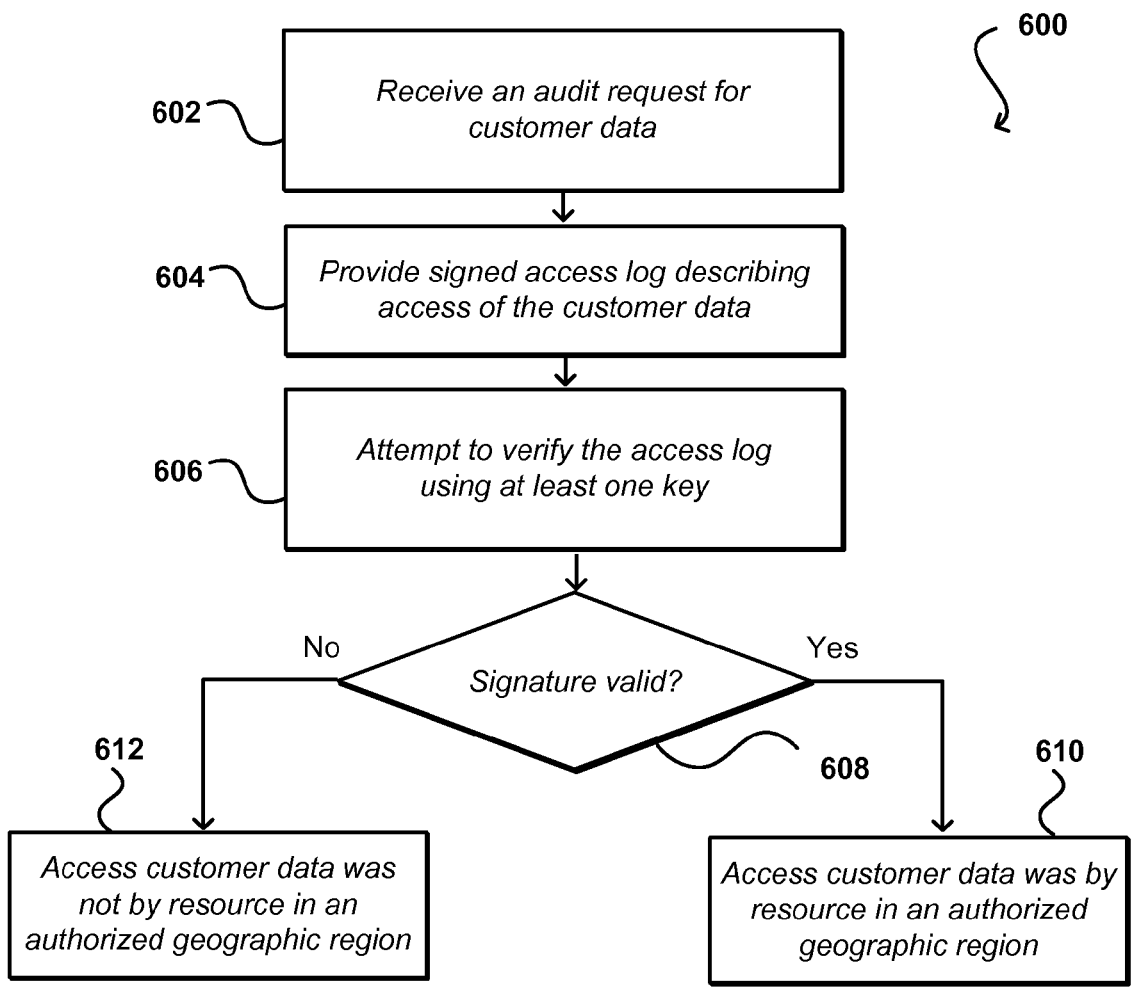
FIG. 6 illustrates an example process for verifying restricted access to data in accordance with various embodiments.

FIG. 6 illustrates an example process 600 for verifying restricted access to data in accordance with various embodiments. It should be understood that, for any process discussed herein, there can be additional, fewer, or alternative steps performed in similar or alternative orders, or in parallel, within the scope of the various embodiments unless otherwise stated.

A customer can make an audit request to determine whether customer data is being accessed by resources in a geographic region that has been authorized by the customer 602. When a resource of the resource provider accesses the customer data, the resource can generate information that describes the types of operations that were performed by the resource on the customer data. This information can be stored, for example, in an access log that is signed by the resource using a private key stored in the resource's Trusted Platform Module (TPM). As mentioned, asymmetric keys can be assigned to resources based on the geographic region in which those resources are located. The resource can use its respective private key stored in the TPM to encrypt (or digitally sign) the access log. Since each private key corresponds to a particular geographic region, encrypting or digitally signing the log using the private key confirms that the encryption or signature was performed by a resource that is physically located in the particular geographic region.

In response to the audit request, the customer can be provided with one or more access logs that each describe access of the customer data by a respective resource of the resource provider 604. The customer can then attempt to verify that access to the customer's data was made by resources in authorized geographic regions 606. To verify that only authorized resources were used to access the customer's data, the customer can also obtain the corresponding public keys for the geographic regions that the customer has authorized to access the customer's data. The customer can then attempt to use these public keys to validate the signed logs 608. The customer can confirm that resources in an authorized geographic region were used if the signatures in the logs are able to be validated using a public key corresponding to an authorized geographic region 610. The customer can parse the information in the logs to further confirm which resources were used to access the customer's data. However, if no public key corresponding to an authorized geographic region is able to validate the signatures in the logs, then the logs were signed using a key that is associated with an unauthorized geographic region and, consequently, the customer can determine that at least one resource located in an unauthorized geographic region accessed the customer's data 612.

Figure 7:
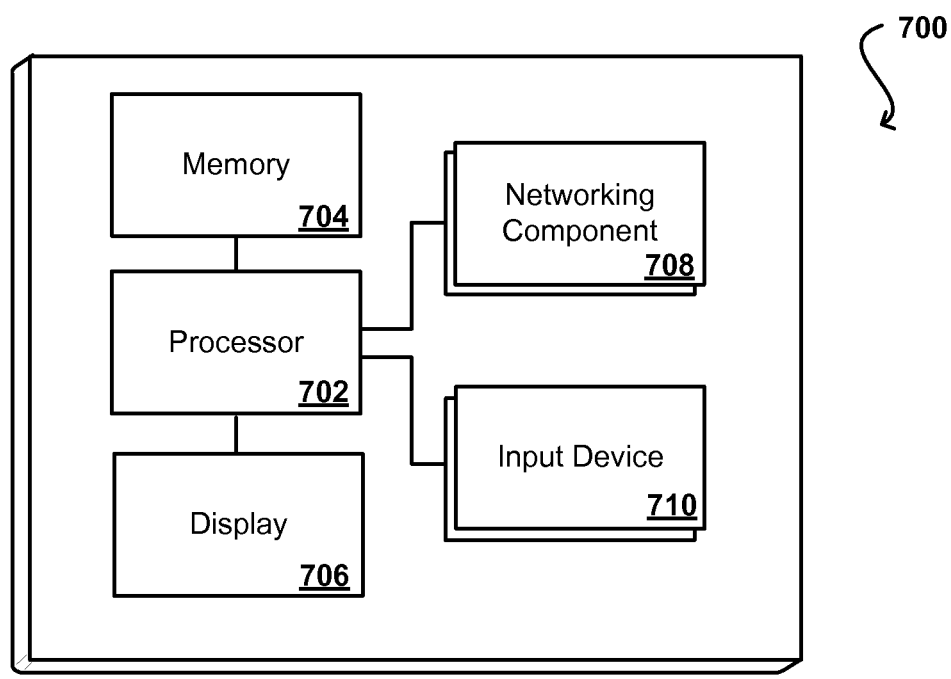
FIG. 7 illustrates a set of components of an example computing device that can be used to perform aspects of various embodiments.

FIG. 7 illustrates a set of basic components of an example computing device 700 that can be utilized to implement aspects of the various embodiments. In this example, the device includes at least one processor 702 for executing instructions that can be stored in a memory device or element 704. As would be apparent to one of ordinary skill in the art, the device can include many types of memory, data storage or computer-readable media, such as a first data storage for program instructions for execution by the at least one processor 702, the same or separate storage can be used for images or data, a removable memory can be available for sharing information with other devices, and any number of communication approaches can be available for sharing with other devices. The device may include at least one type of display element 706, such as a touch screen, electronic ink (e-ink), organic light emitting diode (OLED) or liquid crystal display (LCD), although devices such as servers might convey information via other means, such as through a system of lights and data transmissions. The device typically will include one or more networking components 708, such as a port, network interface card, or wireless transceiver that enables communication over at least one network. The device can include at least one input device 710 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 8:
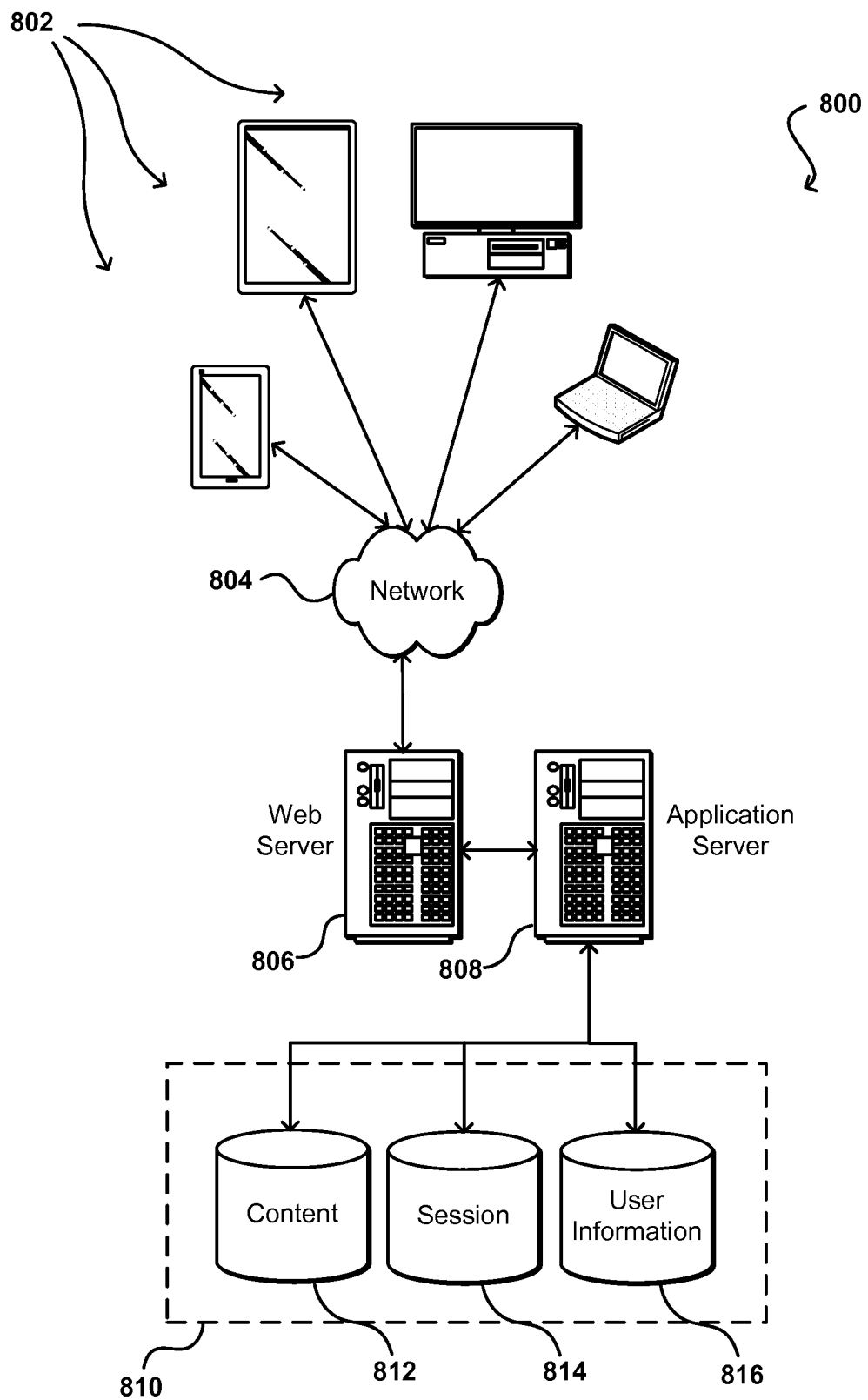
FIG. 8 illustrates an example environment in which aspects of various embodiments can be performed.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, the method comprising:
   receiving, through an interface provided by a resource provider, a request to restrict access to customer data by resources of the resource provider that are located in at least one geographic region, the at least one geographic region having been authorized by the customer;
   associating the customer data with at least one tag that references the at least one geographic region;
   identifying a cryptographic key associated with the at least one geographic region referenced in the at least one tag, the cryptographic key being one of a set of cryptographic keys associated with the customer, and each cryptographic key of the set of cryptographic keys being associated with at least one different set of geographic regions;
   encrypting the customer data stored by the resource provider using the cryptographic key associated with the at least one geographic region, wherein the encrypting is performed based at least in part on access to the customer data having been restricted to the at least one geographic region, and wherein use of the cryptographic key is restricted to resources of the resource provider that are located in the at least one geographic region;

storing the encrypted customer data in at least one first resource of the resource provider that is located in the at least one geographic region that has been authorized by the customer;

receiving, by the resource provider, a request to decrypt and access the encrypted customer data from at least one second resource of the resource provider, wherein the at least one second resource is located outside of the at least one geographic region that has been authorized by the customer;

identifying the cryptographic key associated with the encrypted customer data from the set of cryptographic keys;

identifying the at least one geographic region referenced in the least one tag associated with the cryptographic key;

determining, by the resource provider, that the location of the at least one second resource is outside of the at least one geographic region associated with the cryptographic key; and preventing the at least one second resource from obtaining the cryptographic key based on the location of the at least one second resource.

2. The computer-implemented method of claim 1, the method further comprising:

receiving, by the resource provider, a request to decrypt and access the encrypted customer data from at least one third resource of the resource provider, wherein the at least one third resource is located within the at least one geographic region that has been authorized by the customer;

identifying the cryptographic key associated with the encrypted customer data from the set of cryptographic keys;

identifying the at least one geographic region referenced in the least one tag associated with the cryptographic key;

determining, by the resource provider, that the location of the at least one third resource matches the at least one geographic region associated with the cryptographic key; and processing the request to access the encrypted customer data from the at least one third resource by causing the cryptographic key to be transmitted to the third resource such that the third resource can decrypt the encrypted customer data using the cryptographic key.

3. The computer-implemented method of claim 1, the method further comprising:

receiving, through the interface, an updated request to restrict access to the encrypted customer data to resources of the resource provider that are located in at least one different geographic region that has been authorized by the customer;

associating the encrypted customer data with at least one different tag that references the at least one different geographic region that has been authorized by the customer; and associating the cryptographic key with the at least one different geographic region such that use of the cryptographic key is restricted to resources of the resource provider that are located in the at least one geographic region and the at least one different geographic region.

4. A computer-implemented method, the method comprising:

receiving a request from a customer to restrict access to at least a portion of data to resources of a resource provider that are located in at least one authorized geographic region, wherein the portion of data is stored on at least one resource of the resource provider;

identifying a cryptographic key associated with the at least one authorized geographic region, the cryptographic key being one of a set of cryptographic keys associated with the customer, and each cryptographic key of the set of cryptographic keys being associated with at least one different set of authorized geographic regions;

encrypting the portion of data stored by the resource provider using the cryptographic key associated with the at least one authorized geographic region, wherein the encrypting is performed based at least in part on access to the portion of data having been restricted to the at least one authorized geographic region, and wherein use of the cryptographic key is restricted to resources of the resource provider that are located in the at least one authorized geographic region;

associating the encrypted portion of data with policy information that references the at least one authorized geographic region, wherein the resource provider is able to evaluate the policy information to determine which cryptographic key was used to encrypt the encrypted potion of data, and wherein the resource provider is able to evaluate the policy information to determine whether a request to access encrypted portion of data is permitted based at least in part on a geographic location associated with a source of the request;

receiving, by the resource provider, an access request to access the encrypted portion of data;

identifying the cryptographic key associated with the encrypted portion of data from the set of cryptographic keys;

identifying the at least one authorized geographic region referenced in the policy information associated with the cryptographic key;

determining, by the resource provider, that the geographic location of the source of the access request is outside of the at least one authorized geographic region associated with the cryptographic key; and denying access to the cryptographic key based on the geographic location of the source of the request.

5. The computer-implemented method of claim 4, the method further comprising:

receiving a second request from the customer to prevent access to at least a portion of different data located in at least one unauthorized geographic region, wherein the portion of different data is stored on at least one resource of the resource provider; and associating the portion of different data with policy information that references the at least one unauthorized geographic region, wherein the resource provider is able to evaluate the policy information to determine whether a request to access the portion of different data is permitted based at least in part on a geographic location associated with a source of the request.

6. The computer-implemented method of claim 5, the method further comprising:

determining that at least one resource in the at least one unauthorized geographic region is storing the portion of different data; and causing the portion of different data from the at least one resource in the at least one unauthorized geographic region to be made unavailable.

7. The computer-implemented method of claim 4, the method further comprising:
receiving a second request from the customer to restrict access to the encrypted portion of data to at least one different geographic region in addition to the at least one authorized geographic region;
updating the policy information associated with the encrypted portion of data to reference the at least one different geographic region in addition to the at least one authorized geographic region; and
associating the cryptographic key with the at least one different geographic region such that use of the cryptographic key is restricted to resources of the resource provider that are located in the at least one authorized geographic region and the at least one different geographic region.

8. The computer-implemented method of claim 4, wherein the policy information associated with the encrypted portion of data also references at least one second authorized geographic region, the method further comprising:
receiving a second request from the customer to remove access to the encrypted portion of data from the at least one second authorized geographic region;
updating the policy information associated with the portion of data to remove the reference to the at least one second authorized geographic region; and
removing the association of the cryptographic key with the at least one second authorized geographic region such that use of the cryptographic key is restricted to resources of the resource provider that are located only in the at least one authorized geographic region.

9. The computer-implemented method of claim 4, the method further comprising:
receiving a request to copy the encrypted portion of data to at least one resource of the resource provider that is located in an unauthorized geographic region;
evaluating the policy information associated with the encrypted portion of data to determine that the at least one resource that is located in the unauthorized geographic region is not permitted access to the cryptographic key associated with the encrypted portion of data; and
denying access to the cryptographic key and denying the request to copy the encrypted portion of data to the at least one resource that is located in the unauthorized geographic region.

10. The computer-implemented method of claim 4, the method further comprising:
receiving a request to copy the encrypted portion of data to at least one resource of the resource provider that is located in an unauthorized geographic region;
attempting to copy the encrypted portion of data to the at least one resource that is located in the unauthorized geographic region, wherein the at least one resource is able to evaluate the policy information associated with the encrypted portion of data to determine that the at least one resource is not permitted access to the cryptographic key associated with the encrypted portion of data; and
receiving a denial from the at least one resource that is located in the unauthorized geographic region in response to the attempt to copy the encrypted portion of data.

11. The computer-implemented method of claim 4, the method further comprising:
receiving a second request from the customer to restrict access to at least a portion of different data to comply with at least one data compliance policy;
identifying one or more geographic regions in which resources of the resource provider are able to access the different portion of data in compliance with the data compliance policy;
identifying a different cryptographic key associated with the one or more geographic regions, the different cryptographic key being one of the set of cryptographic keys associated with the customer, and each cryptographic key of the set of cryptographic keys being associated with at least one different set of authorized geographic regions;
encrypting the portion of different data stored by the resource provider using the different cryptographic key associated with the one or more geographic regions, wherein the encrypting is performed based at least in part on access to the portion of data having been restricted to comply with the at least one data compliance policy, and wherein use of the different cryptographic key is restricted to resources of the resource provider that are located in the one or more geographic regions; and
associating the encrypted portion of different data with policy information that references the one or more geographic regions.

12. The computer-implemented method of claim 4, the method further comprising:
receiving an audit request to verify that access to the encrypted portion of data is restricted to resources of the resource provider that are located in the at least one authorized geographic region; and
providing at least one access log describing operations performed using the encrypted portion of data by at least one resource of the resource provider that is located in the at least one authorized geographic region, wherein the at least one access log is encrypted by the at least one resource using a private key that is associated with the at least one authorized geographic region;
wherein the restricted access to the encrypted portion of data by resources of the resource provider that are located in the at least one authorized geographic region is able to be verified in response to the at least one access log being able to be decrypted using a public key corresponding to the at least one authorized geographic region.

13. The computer-implemented method of claim 4, wherein the policy information is inserted into an unencrypted file header corresponding to the encrypted portion of data.

14. The computer-implemented method of claim 1, wherein resources of the resource provider are configured to send requests to decrypt data to a key management system operated by a customer associated with the customer identifier or operated by the resource provider.

15. The computer-implemented method of claim 1, wherein the encrypting is performed based at least in part on the customer data being stored on at least one resource of the resource provider that is located in the at least one authorized geographic region.

16. The computer-implemented method of claim 1, further comprising:

determining that at least a portion of different data must comply with at least one data compliance policy;

identifying one or more different geographic regions in which resources of the resource provider are able to access the different portion of data in compliance with the data compliance policy;

identifying a different cryptographic key associated with the one or more different geographic regions, the cryptographic key being one of the set of cryptographic keys associated with the customer; and encrypting the portion of different data using the different cryptographic key that corresponds to the one or more different geographic regions, wherein access to the different cryptographic key is restricted to resources of the resource provider that are located in the one or more different geographic regions.

17. The computer-implemented method of claim 1, further comprising:

receiving an audit request from the customer to verify that access to the encrypted customer data is restricted to the at least one authorized geographic region; and providing at least one access log that describes operations performed using the encrypted customer data by at least one resource of the resource provider that is located in the at least one authorized geographic region.

18. The computer-implemented method of claim 17, wherein a provenance or integrity of the at least one access log is able to be verified cryptographically.

19. The computer-implemented method of claim 2, wherein causing the encrypted customer data to be decrypted using the cryptographic key associated with the at least one geographic region further comprises:

providing the cryptographic key to the at least third resource for decrypting the encrypted customer data.

20. The computer-implemented method of claim 2, wherein causing the encrypted customer data to be decrypted using the cryptographic key associated with the at least one geographic region further comprises:

decrypting the encrypted customer data using the cryptographic key associated with the at least one geographic region; and providing the decrypted customer data to the third resource.

\* \* \* \* \*